(12) United States Patent
Miyakoshi et al.

(10) Patent No.: US 10,997,382 B2
(45) Date of Patent: May 4, 2021

(54) READING APPARATUS AND METHOD (71) Applicant: TOSHIBA TEC KABUSHIKI KAISHA, Tokyo (JP)

(72) Inventors: Hidehiko Miyakoshi, Mishima Shizuoka (JP); Hitoshi Iizaka, Fuji Shizuoka (JP); Hidehiro Naito, Mishima Shizuoka (JP); Yuki Kawaguchi, Tagata Shizuoka (JP); Naoki Ogomori, Izunokuni Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/515,138

(22) Filed: Jul. 18, 2019

(65) Prior Publication Data

US 2020/0117866 A1 Apr. 16, 2020

(30) Foreign Application Priority Data

Oct. 15, 2018 (JP) .............................. JP2018-193985

(51) Int. Cl.
*G06K 7/10* (2006.01)
*G06K 19/06* (2006.01)
*G06K 7/14* (2006.01)

(52) U.S. Cl.
CPC ... *G06K 7/10801* (2013.01); *G06K 19/06009* (2013.01); *G06K 7/1413* (2013.01); *G06K 2207/1013* (2013.01); *G06K 2209/17* (2013.01)

(58) Field of Classification Search
CPC .............. G06K 7/10801; G06K 19/06009
(Continued)

(56) References Cited

U.S. PATENT DOCUMENTS

2008/0211671 A1* 9/2008 Daily .................. G07G 1/0036
340/572.1
2013/0182122 A1 7/2013 Naito et al.
(Continued)

FOREIGN PATENT DOCUMENTS

EP 2980729 2/2016

OTHER PUBLICATIONS

Extended European Search Report for European Patent Application No. 19192563.5 dated Mar. 17, 2020.

*Primary Examiner* — Michael G Lee
*Assistant Examiner* — David Tardif
(74) *Attorney, Agent, or Firm* — Amin, Turocy & Watson, LLP (57) ABSTRACT

A reading apparatus according to an embodiment includes a captured-image reading section, an article detecting section, an object recognizing section, and a code reading section. The captured-image reading section reads, from an imaging apparatus that captures a captured image associated with distance information indicating distances to articles, the captured image associated with the distance information. The article detecting section detects images of articles in a preset predetermined imaging region in the captured image. The object recognizing section performs, based on the distance information, object recognition processing of an object, the object being an article closest from the imaging apparatus among the articles. The code reading section performs, based on the distance information, if a distance between the object and the imaging apparatus is equal to or smaller than a predetermined distance, code reading processing for detecting a code symbol from the predetermined imaging region and reading code information from the code symbol.

21 Claims, 7 Drawing Sheets

(58) Field of Classification Search
USPC .................................................. 235/462.17
See application file for complete search history.

(56) References Cited

U.S. PATENT DOCUMENTS

| | | |
|---|---|---|
| 2017/0011378 A1 | 1/2017 | Inoue et al. |
| 2018/0121695 A1* | 5/2018 | Ynclino, V ............ G06Q 20/20 |
| 2018/0173941 A1* | 6/2018 | Shin ................... G06K 9/00288 |
| 2018/0181933 A1 | 6/2018 | Naito |
| 2018/0232595 A1 | 8/2018 | Nobuoka et al. |
| 2019/0318588 A1* | 10/2019 | Miyakoshi ........... G06K 9/6202 |
| 2020/0122344 A1* | 4/2020 | Lee ....................... B25J 19/022 |

* cited by examiner

READING APPARATUS AND METHOD

CROSS-REFERENCE TO RELATED APPLICATION

This application is based upon and claims the benefit of priority from Japanese Patent Application No. 2018-193985, filed in Oct. 15, 2018, the entire contents of which are incorporated herein by reference.

FIELD

Embodiments described herein relate generally to a reading apparatus and a method.

BACKGROUND

There has been used, in sales registration in a store, a technique for supporting commodity registration by performing processing for specifying a commodity using a reading apparatus having a function of object recognition (generic object recognition) or a processing for selecting candidates of a commodity and causing an operator to select a candidate. For example, as related art, there has been disclosed a technique concerning a commodity reading apparatus that specifies a commodity by switching code reading processing for reading a commodity code from a code symbol such as a barcode and object recognition processing and performs sales registration.

In recent years, for improvement of efficiency of registration processing or a reduction in a burden on a checker, there has been developed a reading apparatus that can perform commodity specifying or selection of a commodity candidate by object recognition even if a commodity to be registered is left placed in a basket or on a register counter. In such a reading apparatus, there has been desired a technique that can achieve optimization of switching of object recognition processing and code reading processing and achieve improvement of reading accuracy or reading efficiency.

DETAILED DESCRIPTION

An object of embodiments is to provide a reading apparatus and a program that can efficiently perform switching of object recognition processing and code reading processing.

A reading apparatus according to an embodiment includes a captured-image reading section, an article detecting section, an object recognizing section, and a code reading section. The captured-image reading section reads, from an imaging apparatus that captures a captured image associated with distance information indicating distances to articles, the captured image associated with the distance information. The article detecting section detects images of articles in a preset predetermined imaging region in the captured image. The object recognizing section performs, based on the distance information, object recognition processing of an object, the object being an article closest from the imaging apparatus among the articles detected in the predetermined region. The code reading section performs, based on the distance information, if a distance between the object and the imaging apparatus is equal to or smaller than a predetermined distance, code reading processing for detecting a code symbol from the predetermined imaging region and reading code information from the code symbol.

A reading apparatus and a program according to an embodiment are explained in detail below with reference to the accompanying drawings. In the embodiment explained below, an example is explained in which a scanner used while being connected to a POS (Point Of Sales) terminal used in a supermarket, a convenience store, or the like is applied as the reading apparatus. However, an application example is not limited to this example. The reading apparatus according to the embodiment may be used while being mounted on or connected to a self-checkout apparatus.

Figure 1:
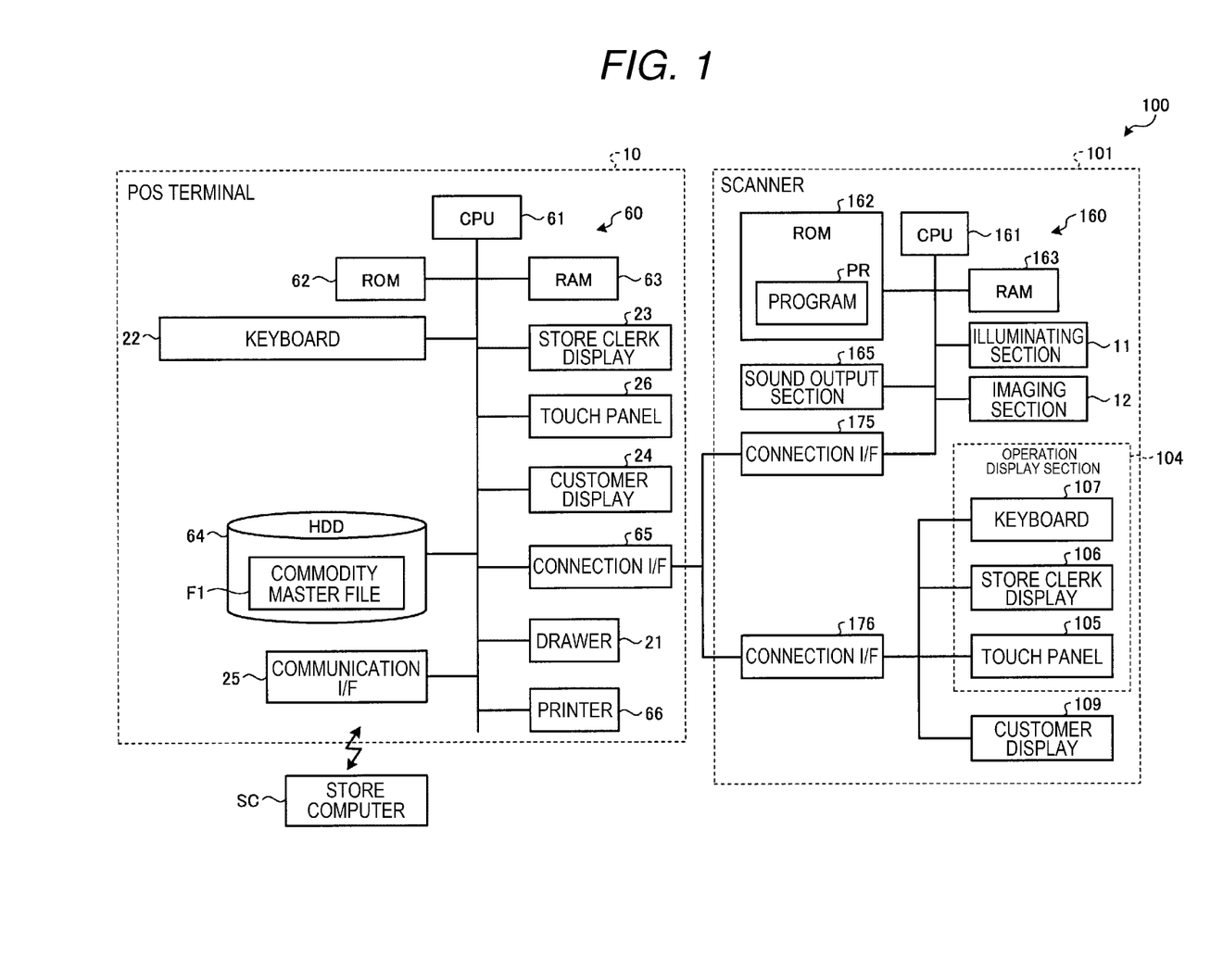
FIG. 1 is a block diagram illustrating an overall configuration of a POS system according to an embodiment.

FIG. 1 is a block diagram illustrating an overall configuration of a POS system 100 according to this embodiment. The POS system 100 includes a POS terminal 10 and a scanner 101 connected to the POS terminal 10.

The POS terminal 10 includes a microcomputer (a control section 60) that executes information processing. The control section 60 is configured by connecting a CPU (Central Processing Unit) 61 that executes various kinds of arithmetic processing and controls sections, a ROM (Read Only Memory) 62, and a RAM (Random Access Memory) 63 via a bus.

A drawer 21, a keyboard 22, a store clerk display 23, a touch panel 26, and a customer display 24 are connected to the CPU 61 of the POS terminal 10 via various input and output circuits. The CPU 61 controls these sections.

A HDD (Hard Disk Drive) 64 is connected to the CPU 61 of the POS terminal 10. The HDD 64 has stored therein a commodity master file F1. The commodity master file F1 is delivered from a store computer SC at predetermined timing such as timing before store opening and stored in the HDD 64.

The commodity master file F1 has stored therein, in association with a commodity code for identifying a commodity, information such as a commodity name, a unit price, and a classification of the commodity. The commodity master file F1 has stored therein, as reference data used for object recognition, a captured image (a reference image) of the commodity. The commodity master file F1 may have stored therein, as the reference data for the object recognition, feature values extracted from the reference image, that is, data indicating color information, a surface shape, texture of a surface, and the like of the reference image. In this way, the commodity master file F1 (commodity-information storing means) associates information related to the captured image of the commodity (the captured image or data related to the captured image) and identification information (a commodity code, a commodity name, or the like) for identifying the commodity.

A communication I/F (Interface) 25 for executing data communication with the store computer SC is connected to the CPU 61 of the POS terminal 10 via an input and output circuit (not illustrated in FIG. 1). The store computer SC is set in a backyard or the like of a store. The commodity master file F1 delivered to the POS terminal 10 is stored in a HDD (not illustrated in FIG. 1) of the store computer SC.

Further, a connection I/F 65 that enables data transmission and reception between the POS terminal 10 and the scanner 101 is connected to the CPU 61 of the POS terminal 10. The scanner 101 is connected to the connection I/F 65. A printer 66 that prints a receipt and the like is connected to the CPU 61 of the POS terminal 10. The printer 66 prints transaction content of one transaction on the receipt under the control by the CPU 61.

The scanner 101 includes a microcomputer (a control section 160) to which a CPU 161, a ROM 162, and a RAM 163 are connected via a bus. The ROM 162 has stored therein a program PR according to this embodiment. An illuminating section 11, an imaging section 12, a sound output section 165, and the like are connected to the CPU 161 via various buses and I/Fs. The CPU 161 controls operations of these sections. The control section 160 is connected to the POS terminal 10 via a connection I/F 175.

The sound output section 165 is a sound circuit, a speaker, and the like for generating preset alarm sound and the like. The illuminating section 11 is configured by linearly arranging, for example, a plurality of LEDs (Light Emitting Diodes). The illuminating section 11 emits pulse light according to a light emission control signal input from the control section 160 and illuminates an imaging region of the imaging section 12. The illuminating section 11 may be configured by other light emitting elements.

The imaging section 12 is an imaging device including an image sensor (also referred to as imaging element) such as a CCD (Charge Coupled Device) or a CMOS (Complementary Metal-Oxide Semiconductor) and an optical element such as a lens. The imaging section 12 sequentially reads frame images into the RAM 163 at a frame rate (the number of frames read in one second) based on an imaging control signal.

In this embodiment, the imaging section 12 (also referred to as TOF camera) having a TOF (Time Of Flight) function is used as the imaging section 12. For example, the TOF camera projects an infrared ray applied with frequency modulation from infrared LEDs arranged in an array shape and measures a phase of a modulation signal reflected from an object (an article) in a visual field to measure a distance to the article. The TOF camera is imaging means that can acquire distance information on a real time basis. That is, the imaging section 12 is an imaging device that captures a captured image associated with the distance information indicating the distance to the article.

The POS system 100 in this embodiment acquires distance information with the TOF camera. Consequently, it is possible to select an article at the top in a shopping basket, that is, an article closest from the imaging section 12. In this embodiment, the distance from the imaging section 12 to a commodity is determined using the distance information. An object recognition mode and a code reading mode are automatically switched according to the distance between the commodity and the imaging section 12.

The imaging section 12 sequentially outputs image data, that is, captures images associated with distance information to the control section 160 of the scanner 101. If the POS terminal 10 performs respective kinds of processing, the captured images only have to be output to the control section 60 of the POS terminal 10.

The imaging section 12 may include, respectively as separate sensor devices, the image sensor for acquiring a frame image and the TOF camera for acquiring a distance image or may include one sensor device having functions of both of the image sensor and the TOF camera.

An operation display section 104 for store clerks and a customer display 109 (for both of which, refer to FIG. 2) are connected to the CPU 161 via connection I/Fs 175 and 176. The operation display section 104 for store clerks and the customer display 109 are connected to the CPU 61 of the POS terminal 10 via the connection I/F 176 and the connection I/F 65 of the POS terminal 10. The operation display section 104 for store clerks includes a keyboard 107, a store clerk display 106, and a touch panel 105 disposed on the store clerk display 106.

Figure 2:
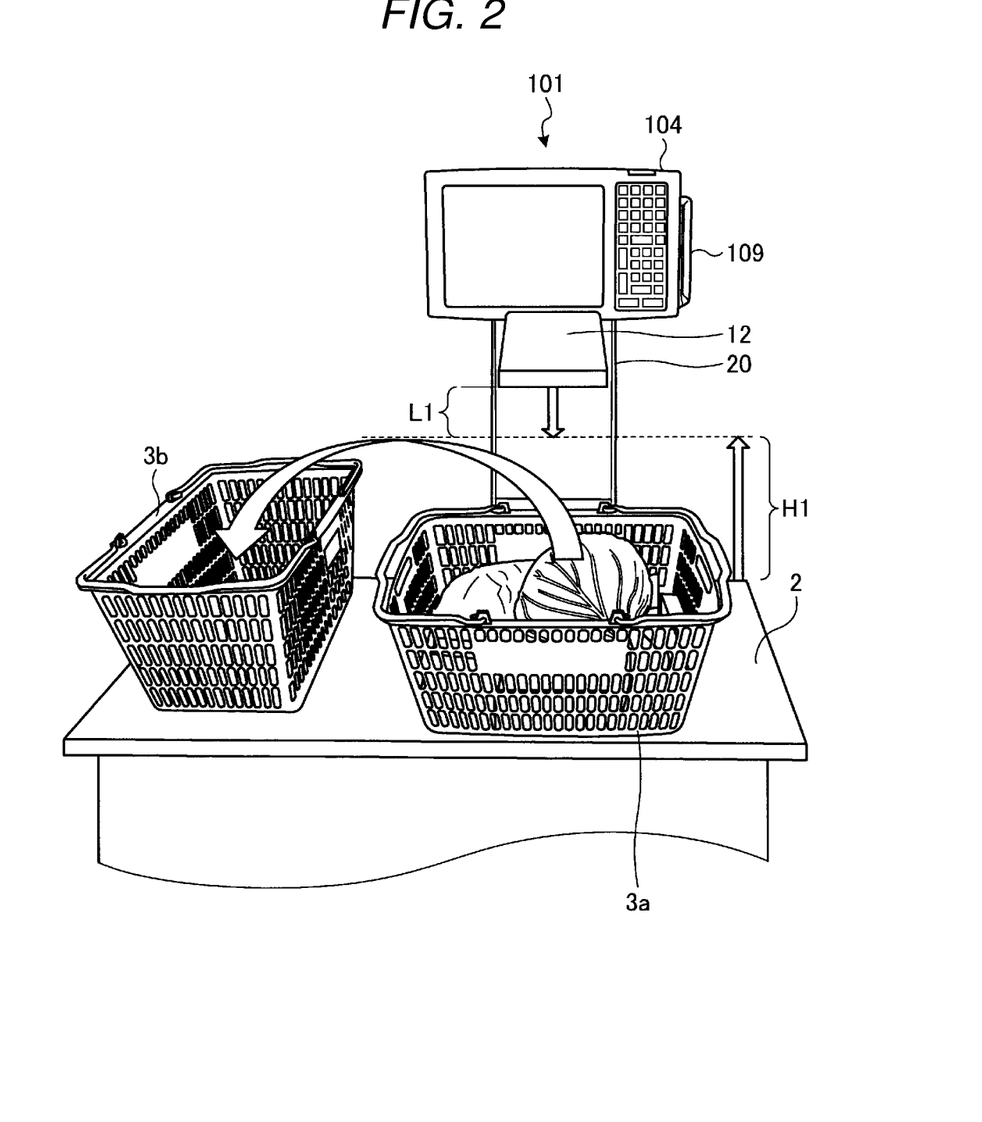
FIG. 2 is an exterior view of a scanner.

The store clerk display 106 is configured by, for example, a liquid crystal display and has a configuration in which the touch panel 105 is laminated on a liquid crystal surface. As the customer display 109, a liquid crystal display, a line indicator that can display a plurality of rows, and the like can be used.

FIG. 2 is an exterior view of the scanner 101. As illustrated in FIG. 2, the scanner 101 is set on the upper surface of a sacker table 2. The sacker table 2 is a worktable used for placing a shopping basket, commodities, and the like on the upper surface. The sacker table 2 is used as a register counter. The scanner 101 includes the operation display section 104 for store clerks at the upper end of a flat supporting section 20. The customer display 109 is provided substantially back to back with the operation display section 104 for store clerks on the opposite side of the operation display section 104 for store clerks.

The scanner 101 includes the imaging section 12 in a position on the near side when viewed from the operator facing the operation display section 104 and below a screen of the store clerk display 106. The position (the height) and an angle of an optical axis of the imaging section 12 are set such that all contents of a shopping basket 3a placed on the sacker table 2 are included in the imaging region of the imaging section 12. During operation, commodities may be directly placed on the sacker table 2 without using a shopping basket.

As a schematic operation method, if receiving, from a customer, the shopping basket 3a including commodities to be purchased, the operator places the shopping basket 3a on the sacker table 2 below the imaging section 12. The scanner 101 recognizes the shopping basket 3a and starts object recognition processing. Concerning a target commodity of the object recognition processing such as a vegetable or a fruit, the scanner 101 performs the object recognition processing and specifies the commodity while keeping the commodity put in the shopping basket 3a. If detecting that the commodity is specified and taken out to the outside of the shopping basket 3a, the scanner 101 outputs information concerning the commodity to the POS terminal 10. On the other hand, concerning a commodity other than the target commodity of the object recognition processing, the operator brings the commodity close to the imaging section 12 of the scanner 101, holds up a barcode attached to the commodity over the imaging section 12, and performs code reading. If detecting that the commodity is taken out to the outside of the shopping basket 3a after a commodity code is read, the scanner 101 outputs read commodity information to the POS terminal 10.

In this embodiment, if an imaging target object is present within a predetermined distance L1 from the imaging section 12, the scanner 101 automatically switches a reading mode from the object recognition mode to the code reading mode and starts code reading processing. The predetermined distance L1 can also be grasped as a predetermined height H1 decided with respect to a counter upper surface of the sacker table 2. In other words, if the imaging target object reaches the predetermined code reading start height H1, the scanner 101 switches the reading mode from the object recognition mode to the code reading mode and starts the code reading processing.

In the object recognition mode, the scanner 101 captures a color image under natural light. On the other hand, in the code reading mode, the scanner 101 lights the illuminating section 11 (see FIG. 1) and captures a monochrome image. Consequently, in the code reading mode, contrast of white and black of a code symbol is sufficiently increased to achieve improvement of code reading efficiency and reading accuracy.

In this embodiment, it is possible to automatically switch the reading mode at timing conforming to a series of operation of the code reading processing performed by the operator in the past for taking a commodity from the shopping basket 3a, holding up a barcode over the imaging section 12, and moving the commodity after the reading to a shopping basket 3b. That is, the reading mode is switched from the object recognition mode to the code reading mode by being triggered by an act of bringing the commodity close to the imaging section 12 and holding up the commodity over the imaging section 12. Therefore, the operator can start the code reading mode without a burden in a natural motion and can efficiently switch the object recognition processing and the code reading processing.

Other configuration examples of the imaging section

In FIG. 2, the configuration example is shown in which the imaging section 12 is held in front of the supporting section 20. However, a setting position of the imaging section 12 is not limited to this.

Figure 3:
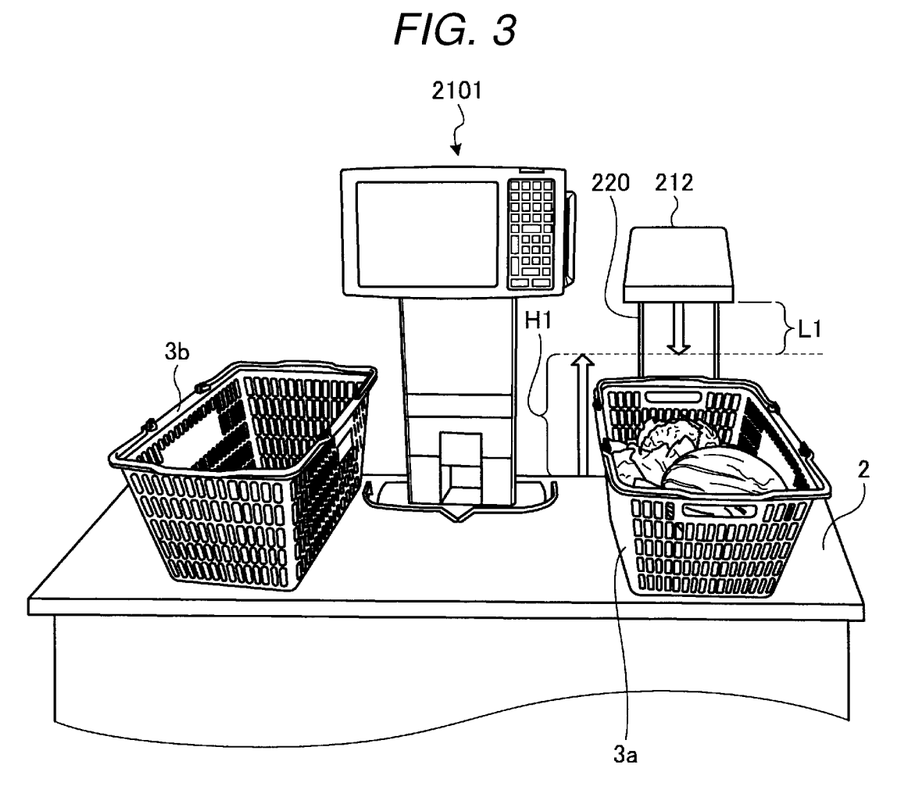
FIG. 3 is an exterior view of a scanner and an imaging section provided separately from the scanner.

FIG. 3 is an exterior view of a scanner and the imaging section provided separately from the scanner. In FIG. 2, the shopping basket 3a set as a reading target is placed in front of the scanner 101 and read. However, a placing position of the shopping basket 3a can be changed as appropriate. As illustrated in FIG. 3, operation may be performed in which the shopping basket 3a set as the reading target, in which unregistered commodities are put, is placed on the right side of a scanner 2101 and the shopping basket 3b, in which commodities after registration is put, is placed on the left side of the scanner 2101.

According to such an operation method, in FIG. 3, an imaging section 212 separate from the scanner 2101 is erected on the sacker table 2 on the right side of the scanner 2101. That is, the imaging section 212 is set on the upper surface of the sacker table 2 by a supporting section 220 of the imaging section 212. The height and an angle of an optical axis of the imaging section 212 are set such that all contents of the shopping basket 3a set as a reading target are included in an imaging region. A hardware configuration of the imaging section 212 and connection to other components of the scanner 2101 are not changed. As illustrated in FIG. 1, the imaging section 212 is connected to the CPU 161 of the scanner 2101 and the POS terminal 10 via the connection I/F 175.

In the configuration illustrated in FIG. 3, as in FIG. 2, a position in changing the reading mode only has to be set as the predetermined distance L1 from the imaging section 212. Alternatively, the code reading start height H1, which is height from the counter upper surface of the sacker table 2, may be set as a determination reference for the mode switching.

It is possible to change, as appropriate according to a layout or the like of the store, on which of the left and the right of the scanner 2101 the reading target shopping basket 3a, in which unregistered commodities are put, is placed. Oppositely from FIG. 3, the supporting section 220 of the imaging section 212 may be set on the upper surface of the sacker table 2 on the left side of the scanner 2101.

The program PR (see FIG. 1) executed by the scanner 101 in this embodiment is explained. A software configuration can be applied in both of the configurations of the scanners 101 and 2101 without a difference. Therefore, in the following explanation, components are denoted by reference numerals and signs assuming implementation in the scanner 101.

Figure 4:
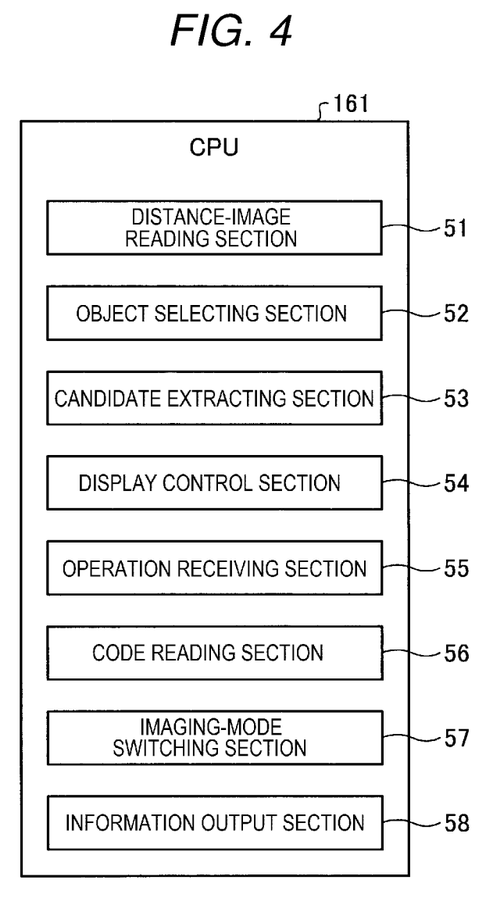
FIG. 4 is a block diagram illustrating a functional configuration realized by a CPU Of the scanner.

FIG. 4 is a block diagram illustrating a functional configuration realized by the CPU 161 of the scanner 101. As illustrated in FIG. 4, the program PR (see FIG. 1) stored in the ROM 162 of the scanner 101 has a module configuration including a distance-image reading section 51, an object selecting section 52, a candidate extracting section 53, a display control section 54, an operation receiving section 55, a code reading section 56, an imaging-mode switching section 57, and an information output section 58. The CPU 161 (a processor) reads out the program PR from the ROM 162 and loads the sections onto a main storage device. Consequently, the sections are generated on the main storage device.

The program PR executed by the scanner 101 in this embodiment is incorporated in the ROM 162 in advance and provided. The program PR executed in the scanner 101 in this embodiment may be provided while being recorded in a computer-readable recording medium such as a CD-ROM, a flexible disk (FD), a CD-R, or a DVD (Digital Versatile Disk) as a file in an installable form or an executable form.

Further, the program PR executed in the scanner 101 in this embodiment may be stored on a computer connected to a network such as the Internet and provided by being downloaded through the network. The program PR executed in the scanner 101 in this embodiment may be provided or distributed through the network such as the Internet.

The program PR in this embodiment may be stored in the HDD 64 or the like of the POS terminal 10. The CPU 61 of the POS terminal 10 may execute the program PR to thereby realize functions of the sections. The functions of the sections are explained below.

The distance-image reading section 51 (captured-image reading means) reads a captured image (a distance image) captured by the imaging section 12 onto the RAM 163 of the scanner 101.

The object selecting section 52 (article detecting means) detects an image of an article in a preset predetermined imaging region in the captured image. The predetermined imaging region only has to be a region of a guidance indicator 72 (see FIG. 5) used in placing the shopping basket 3a, a region of an imaging region on the inner side of the shopping basket 3a, or the like.

The object selecting section 52 selects, based on the distance information, articles as an object of registration processing in ascending order of distances from the imaging section 12. For example, the object selecting section 52 divides the distance image into images of a multilayer structure for each of the distances and extracts, based on the distance information and position information (information indicating two-dimensional positions), articles recognized as a group. The object selecting section 52 sets an article located in the top layer as an article closest from the imaging section 12 and selects the article as an object of the registration processing.

If an article is extracted (detected), processing such as edge detection may be performed to extract an article using a two-dimensional color image or monochrome image not particularly including the distance information. The distance information, the position information, and the processing such as the edge detection may be combined as appropriate. A procedure for combining the respective kinds of processing is not particularly limited.

The candidate extracting section 53 starts object recognition processing on an image of the object selected by the object selecting section 52. That is, the object selecting section 52 and the candidate extracting section 53 function as object recognizing means for performing, based on the distance information, the object recognition processing of an object, the object being an article at the shortest distance from the imaging section 12 among articles detected by the object selecting section 52 in the predetermined imaging region.

The object recognition is a technique for identifying an exterior characteristic of a target article from captured image data and specifying a type and the like of the article. The candidate extracting section 53 extracts a feature value, which is data indicating an exterior characteristic, from an image region of an article selected by the object selecting section 52. The candidate extracting section 53 collates the extracted feature value with feature value data of reference images of commodities included in the commodity master file F1 and calculates similarity. The candidate extracting section 53 extracts at least one commodity having high similarity as a commodity candidate.

The candidate extracting section 53 extracts, as a result of the object recognition processing, at least one candidate of a commodity (commodity candidate) similar to an article set as a registration target from the commodity master file F1 (see FIG. 1). That is, the candidate extracting section 53 (candidate selecting means) selects, from the commodity master file F1, a commodity candidate corresponding to the object selected by the object selecting section 52.

The display control section 54 respectively generates display data output to the store clerk display 106 and the customer display 109 of the scanner 101 and controls display processing in the displays. For example, the display control section 54 displays, on the store clerk display 106 of the scanner 101, a reading screen 70 (see FIGS. 5 to 7) displayed during commodity reading processing. The display control section 54 (display output means) generates display data for selectably displaying, on the store clerk display 106, information indicating the commodity candidate selected by the candidate extracting section 53 and outputs the display data to the store clerk display 106. A screen configuration example is explained below.

The operation receiving section 55 receives operation on the keyboard 107 and the touch panel 105 of the scanner 101. For example, the operation receiving section 55 receives operation for selecting one commodity with respect to the commodity candidates displayed on the store clerk display 106 by the display control section 54. The operation receiving section 55 (operation receiving means) receives, via a display screen displayed and output by the display control section 54, operation for selecting, as a sales target commodity, the commodity candidate selected by the candidate extracting section 53.

The code reading section 56 (code reading means) starts the code reading processing based on the distance information included in the distance image if the distance between the imaging object and the imaging section 12 is equal to or smaller than the preset predetermined distance L1. In the code reading processing, the code reading section 56 detects a code symbol such as a barcode from a predetermined imaging region, decodes the code symbol, and reads code information such as a commodity code and a discount code. The predetermined imaging region only has to be the region of the guidance indicator 72 (see FIG. 5) used in placing the shopping basket 3a, the imaging region on the inner side of the shopping basket 3a, or the like.

The imaging-mode switching section 57 (imaging-condition switching means) switches the reading mode of the imaging section 12 from the object recognition mode to the code reading mode if the distance between the object selected by the object selecting section 52 and the imaging section 12 is equal to or smaller than the predetermined distance L1. In this case, the imaging-mode switching section 57 switches an imaging condition of the imaging section 12 from an imaging condition during the object recognition processing to an imaging condition during the code reading processing.

In the object recognition mode, imaging in the natural light is performed and the illuminating section 11 is turned off. In the object recognitionmode, the distance-image reading section 51 reads a color image such as an RGB image from the imaging section 12. In the object recognition mode, image quality of a degree for obtaining texture of a surface only has to be obtained. Therefore, since it is unnecessary to form a high-resolution image in the object recognition mode, the distance-image reading section 51 may capture a moving image from the imaging section 12. If a still image is captured, it is unnecessary to increase shutter speed. That is, if a frame image is captured at a predetermined frame rate, the frame rate may be set rather low. Since a feature value of an image can be extracted even if noise is slightly superimposed on an image, a gain of the imaging element only has to be increased even in a state without illumination to obtain a captured image in a state in which sensitivity is increased.

On the other hand, in the code reading mode, an edge of a black portion has to be detected with respect to a code symbol such as a barcode or a two-dimensional code. Therefore, in the code reading mode, imaging using illumination is performed and the illuminating section 11 is lit. In the code reading mode, the distance-image reading section 51 reads a monochrome image with the imaging section 12. If the gain of the imaging element is increased, noise is easily superimposed because the sensitivity increases. Therefore, in the code reading mode, the gain of the imaging element is reduced to achieve a reduction in noise to make it easy to detect the edge. In the code reading mode, the distance-image reading section 51 captures a still image with the imaging section 12. It is desirable to increase the shutter speed such that an edge of a code symbol image does not blur.

In the above explanation, the illuminating section 11 is turned off in the object recognition mode. However, the illuminating section 11 may be lit at illuminance lower than illuminance in the code reading mode. In other words, the imaging-mode switching section 57 increases illuminance of illumination for imaging in the code reading processing.

If the object selected by the object selectin section 52 is on the outside of the predetermined imaging region, the information output section 58 (information output means)

outputs the code information read by the code reading section 56 to the POS terminal 10 as information related to the sales target. The predetermined imaging region only has to be the region of the guidance indicator 72 (see FIG. 5) used in placing the shopping basket 3a, the imaging region on the inner side of the shopping basket 3a, or the like.

If the distance between the object selected by the object selecting section 52 and the imaging section 12 is not equal to or smaller than the predetermined distance L1 and the object is on the outside of the predetermined imaging region (e.g., outside of the image region of the shopping basket 3a), the information output section 58 outputs information indicating the commodity candidate, the selection operation for which is received by the operation receiving section 55, to the POS terminal 10 as information related to the sales target.

An output destination of the information related to the sales target is not limited to the POS terminal 10. The information related to the sales target may be output to another apparatus according to a system to which the scanner 101 is applied.

The CPU 61 (see FIG. 1) of the POS terminal 10 functions as a registration means for receiving commodity information output by the information output section 58 of the scanner 101 and performing information registration of an object based on the commodity information. The information registration is not limited to sales registration of a commodity. The CPU 61 may perform processing for reading information necessary for various kinds of information processing from an article such as a discount coupon or a card indicating necessity and unnecessity of a register bag or the like, an application to fund raising, and the like and registering the information. In this case, the CPU 61 may register member information read from a member card in association with the information.

A configuration example and a transition example of a display screen are explained with reference to FIGS. 5 to 7.

Figure 5:
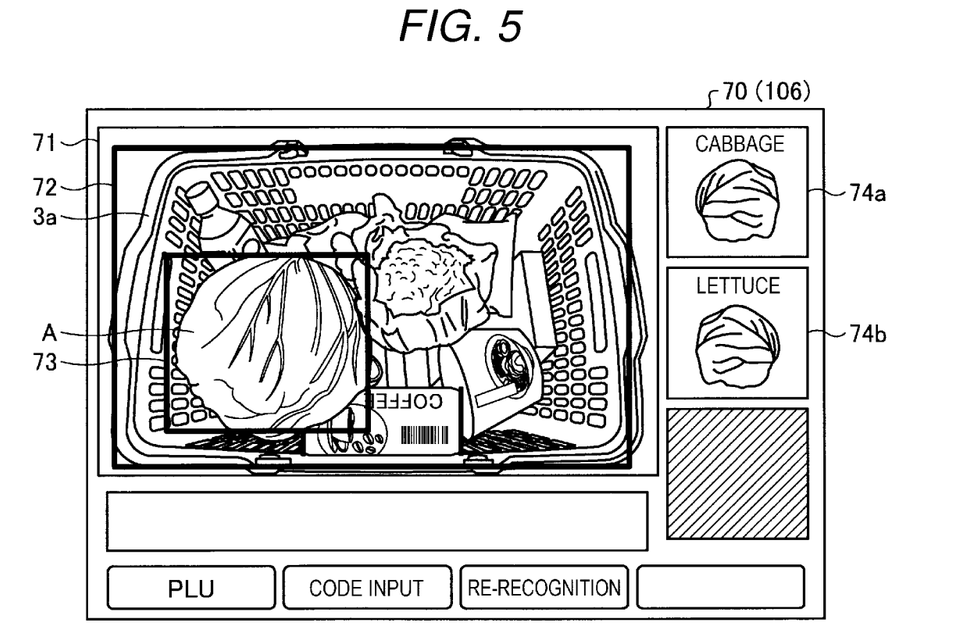
FIG. 5 is a diagram illustrating a screen example during object recognition processing.

FIG. 5 is a diagram illustrating a configuration example of the reading screen 70. A captured image 71 of the imaging section 12 is displayed on the reading screen 70 on a real time basis. The display control section 54 displays, in a display region of the captured image 71, the guidance indicator (a guideline) 72 indicating a position where the shopping basket 3a should be placed. The guidance indicator 72 is clearly seen if the guidance indicator 72 is displayed as, for example, a colored frame line. As an example, the guidance indicator 72 is desirably displayed as a yellow rectangular frame line.

By displaying the guidance indicator 72 on the screen in this way, the shopping basket 3a can be placed to fit within the imaging region of the imaging section 12. If commodities are directly placed on the sacker table 2 without using the shopping basket 3a, the commodities can be placed to fit within the imaging region. The object recognition processing and the code reading processing are executed on an article in the region of the guidance indicator 72. Commodity information read by one of the object recognition processing and the code reading processing is output to the POS terminal 10 if it is detected that the object is on the outside of the region of the guidance indicator 72. The image region of the shopping basket 3a may be automatically recognized without displaying the guidance indicator 72. The object recognition processing and the code reading processing may be performed on a commodity in the shopping basket 3a. If it is detected that the commodity is on the outside of the shopping basket 3a, commodity information may be output to the POS terminal 10.

The display control section 54 displays, on the reading screen 70, a registration target article selected by the object selecting section 52 in a state in which the registration target article is distinguishable on a captured image. For example, the display control section 54 attaches a first identification indicator 73 to a commodity A set as a registration target and displays the first identification indicator 73. As an example, the first identification indicator 73 is desirably formed by a colored frame line (e.g., a red frame) or the like generally surrounding an image region of the registration target article. Since there are a variety of shapes of commodities, the frame line does not have to be formed in a rectangular shape in particular and may be formed in a circular shape or an elliptical shape or may be changed as appropriate according to the shapes of the commodities. Since the first identification indicator 73 is attached to an article that is not specified as a commodity yet, the frame line may be displayed as a dotted line or the like or may be flashed and displayed. Alternatively, the first identification indicator 73 may be formed by a mark rather than the frame line. A text or an illustration may be included in the mark.

Concerning at least one commodity candidate extracted by the candidate extracting section 53, the display control section 54 reads, for example, a commodity name, an illustration of a commodity, a photograph image, or the like from the commodity master file F1 as information indicating the commodity candidate and displays the commodity name, the illustration of a commodity, the photograph image, or the like on the store clerk display 106. On the reading screen 70, a display region on the right of the captured image 71 is used as a display region for displaying the commodity candidate. In FIG. 5, an example is shown in which two commodity candidates 74a and 74b are extracted as commodity candidates similar to the commodity A. The display control section 54 arranges and displays illustrations corresponding to the commodity candidates 74a and 74b in descending order of similarities. If only one commodity candidate having high similarity is extracted, an illustration of the one commodity candidate is displayed.

Figure 6:
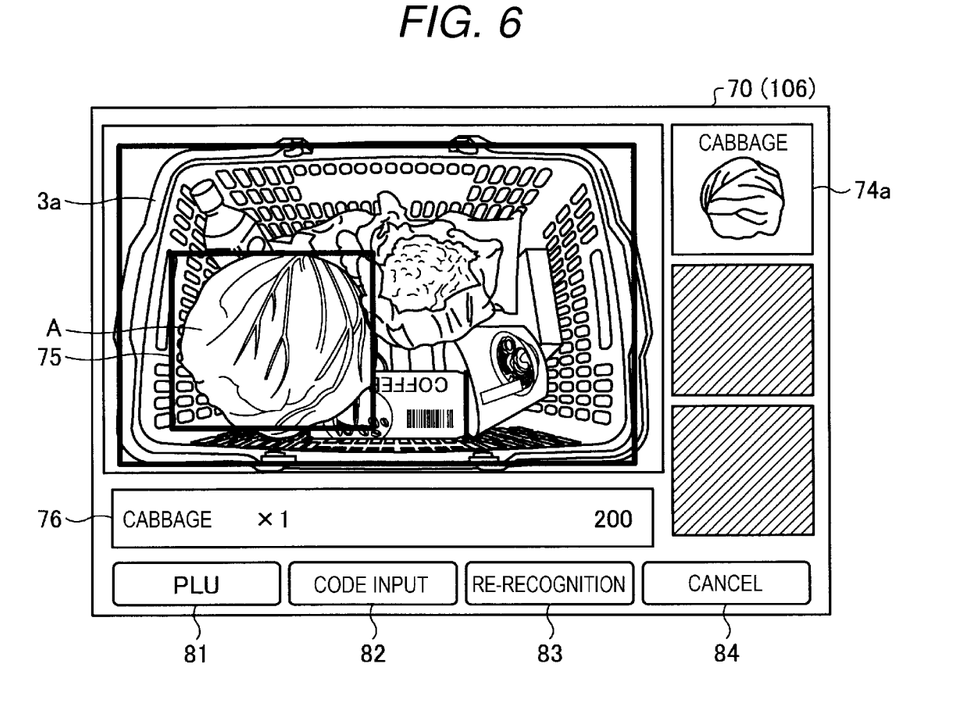
FIG. 6 is a diagram illustrating a screen configuration example in which one commodity is selected out of commodity candidates.

FIG. 6 is a diagram illustrating a screen configuration example in which one commodity is selected out of commodity candidates. If the operation receiving section 55 receives selection operation for the commodity candidate 74a, the display control section 54 attaches, instead of the first identification indicator 73, a second identification indicator 75 different from the first identification indicator 73 to the commodity A selected as a registration target and displays the second identification indicator 75. As an example, the first identification indicator 73 is displayed as a red frame. If one commodity candidate is selected, the display control section 54 desirably displays the second identification indicator 75 as a blue frame. Alternatively, as the second identification indicator 75, the inside of a frame may be hatched and a specified article may be displayed to be grayed out. Alternatively, a mark "finished" may be displayed as the second identification indicator 75 to clearly indicate that specifying processing is finished.

If one commodity candidate is selected, the display control section 54 leaves only an illustration of the selected commodity candidate 74a and grays out an illustration of the unselected commodity candidate 74b (see FIG. 5).

If one commodity candidate is selected, the display control section 54 reads, from the commodity master file F1, commodity information associated with the selected commodity candidate and displays the commodity information in a read information display region 76 together with the number of commodities. The display control section 54 displays, in the customer display 109, information equivalent to content displayed in the read information display region 76.

As illustrated in FIG. 6, a PLU (Price Look Up) button 81, a code input button 82, a re-recognition button 83, a cancellation button 84, and the like are provided on the reading screen 70. The PLU button 81 is an operator for inquiring the commodity master file F1 and starting processing for selecting a commodity based on a commodity classification, a commodity name, and the like. The code input button 82 is an operator for inputting a commodity code via a tenkey and the like of the keyboard 107 and starting processing for reading commodity information of a pertinent commodity from the commodity master file F1. The re-recognition button 83 is an operator for causing the CPU 161 to execute the object recognition again, for example, if an appropriate commodity candidate is not selected. The cancellation button 84 is an operator for, after one commodity candidate is selected and commodity information is displayed in the read information display region 76, cancelling registration of the commodity.

If the commodity A surrounded by the second identification indicator 75 (e.g., a blue frame), a commodity name of the commodity A being specified, is taken out from the shopping basket 3a, the object selecting section 52 detects that the commodity A frames out. The display control section 54 updates the reading screen 70 and erases an operator of the commodity candidate 74a, information displayed in the read information display region 76, and the like. The information output section 58 outputs the commodity information read from the commodity master file F1 such as the commodity name, the number of commodities, and the price displayed in the read information display region 76 to the POS terminal 10. The control section 60 of the POS terminal 10 displays the received commodity information on a registration screen for commodity registration.

The object selecting section 52 selects, based on a captured image (a distance image) and distance information after the frame-out of the article, an article located in the top layer as the next registration processing target article. The display control section 54 attaches the first identification indicator 73 (e.g., a red frame) to the article selected by the object selecting section 52 and displays the first identification indicator 73. The candidate extracting section 53 starts the object recognition processing on an image of the article selected by the object selecting section 52 and extracts a commodity candidate.

In this way, in this embodiment, the reading of the commodity automatically shifts to reading of the next commodity while being triggered by take-out of the read commodity from the shopping basket 3a (i.e., the imaging region of the guidance indicator 72).

A screen example is explained in which the operator lifts a commodity attached with a barcode from a shopping basket, brings the commodity close to the imaging section 12, and performs the code reading processing.

Figure 7:
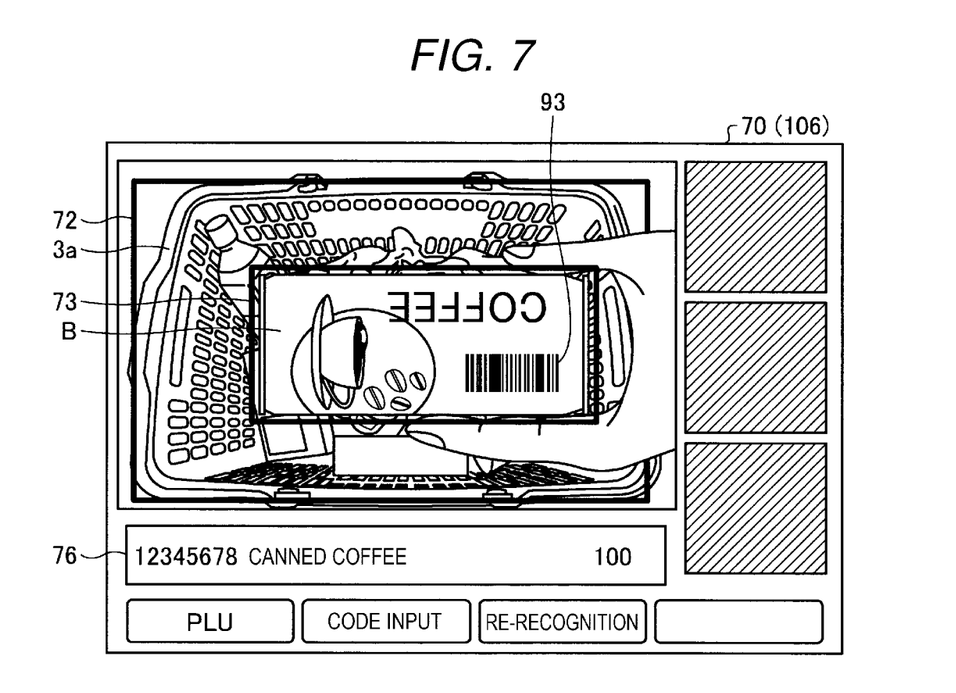
FIG. 7 is a diagram illustrating a screen example in which a commodity attached with a barcode is held up and code reading processing is started.

FIG. 7 is a diagram illustrating a screen example in which a commodity attached with a barcode is held up and the code reading processing is started. In the example illustrated in FIG. 7, if a commodity B is lifted and brought close to the imaging section 12, the commodity B is the closest from the imaging section 12. Therefore, the object selecting section 52 selects, based on distance information of a distance image, the commodity B located in the top layer as a registration processing object. The display control section 54 attaches the first identification indicator 73 (e.g., a red frame) to the commodity B selected by the object selecting section 52 and displays the first identification indicator 73. The candidate extracting section 53 starts the object recognition processing on an image of the object selected by the object selecting section 52.

If the commodity B is held up higher, the distance from the imaging section 12 is equal to or smaller than the predetermined distance L1, and the height from the counter upper surface of the sacker table 2 is equal to or larger than H1, the imaging-mode switching section 57 switches the reading mode from the object recognition mode to the code reading mode. The candidate extracting section 53 suspends the object recognition processing. The code reading section 56 starts the code reading processing, decodes an image 93 of a barcode included in a captured image, and reads a commodity code. The code reading section 56 reads commodity information corresponding to the read commodity code from the commodity master file F1. The display control section 54 displays, in the read information display region 76, the commodity information read from the commodity master file F1. As the commodity information, as illustrated in FIG. 7, information such as the read commodity code, a commodity name, and a unit price read from the commodity master file F1 can be applied.

If the distance between the commodity B and the imaging section 12 is equal to or smaller than the predetermined distance L1 and the processing for the object is switched from the object recognition processing to the code reading processing, a third identification indicator (e.g., a green frame) different from the first identification indicator 73 may be added to the first identification indicator 73 (e.g., a red frame) to indicate that the processing is switched. As the third identification indicator, a message such as "code is being read", a mark of a barcode, or the like may be flashed and displayed to inform the operator that the code reading processing is being performed.

If, after the reading of the commodity information, that is, after the commodity information is displayed and output to the read information display region 76, the commodity B is taken out from the shopping basket 3a and it is detected that an image of the commodity B is on the outside of the region of the guidance indicator 72, the information output section 58 outputs the commodity information of the commodity to the POS terminal 10. The POS terminal 10 displays the received commodity information on the store clerk display 23 and the customer display 24 as information concerning a sales target commodity and registers the information as sales data.

If the distance between the commodity B and the imaging section 12 is equal to or smaller than the predetermined distance L1 once but, thereafter, a commodity code is not read and the distance between the commodity B and the imaging section 12 is larger than the predetermined distance L1, the imaging-mode switching section 57 return the reading mode to the object recognition mode. In this way, the scanner 101 in this embodiment can easily switch the reading method for the commodity B according to the distance to the imaging section 12.

In general, in the object recognition, the recognition processing can be sufficiently performed if a captured image captured under the natural light is used. Conversely, if illumination is used, illumination unevenness occurs and a recognition rate easily decreases. If illumination is use in the object recognition, a type and a setting place of an illumination instrument are sometimes different during machine mounting. A way of irradiation of the illumination on a commodity is likely to change for each apparatus. Therefore, if an image is captured under the illumination by the illumination instrument, learning of the object recognition has to be performed for each apparatus. Learning cost increases. In this way, in the object recognition, a recognition rate is more easily improved if an image is captured using the natural light.

On the other hand, in the code reading processing, in the captured image, a code reading rate can be improved if edge contrast of a code symbol is clearer. That is, it is easier to improve code reading efficiency if the illumination tool is used than when imaging is performed under the natural light.

In this way, preferred illuminating methods are different in the object recognition processing and the code reading processing. Therefore, there has been a demand for improving reading efficiency of both of the object recognition processing and the code reading processing with a simpler method.

On the other hand, in this embodiment, if the distance between the object of the object recognition processing and the imaging section 12 is equal to or smaller than the predetermined distance L1 (see FIG. 5), the processing for the object is switched from the object recognition processing to the code reading processing. At the same time, the imaging condition (the imaging mode) of the imaging apparatus is switched. Consequently, if an act of holding up the commodity attached with the barcode over a reading window is performed as in the past, since the distance between the commodity and the imaging section 12 decreases, the imaging mode is switched to the imaging mode suitable for the code reading processing and the barcode can be imaged. Therefore, even in a reading apparatus that can perform the object recognition processing while keeping an object put in the basket, it is possible to automatically switch the imaging condition and achieve improvement of reading accuracy or reading efficiency of a code symbol.

Figure 8:
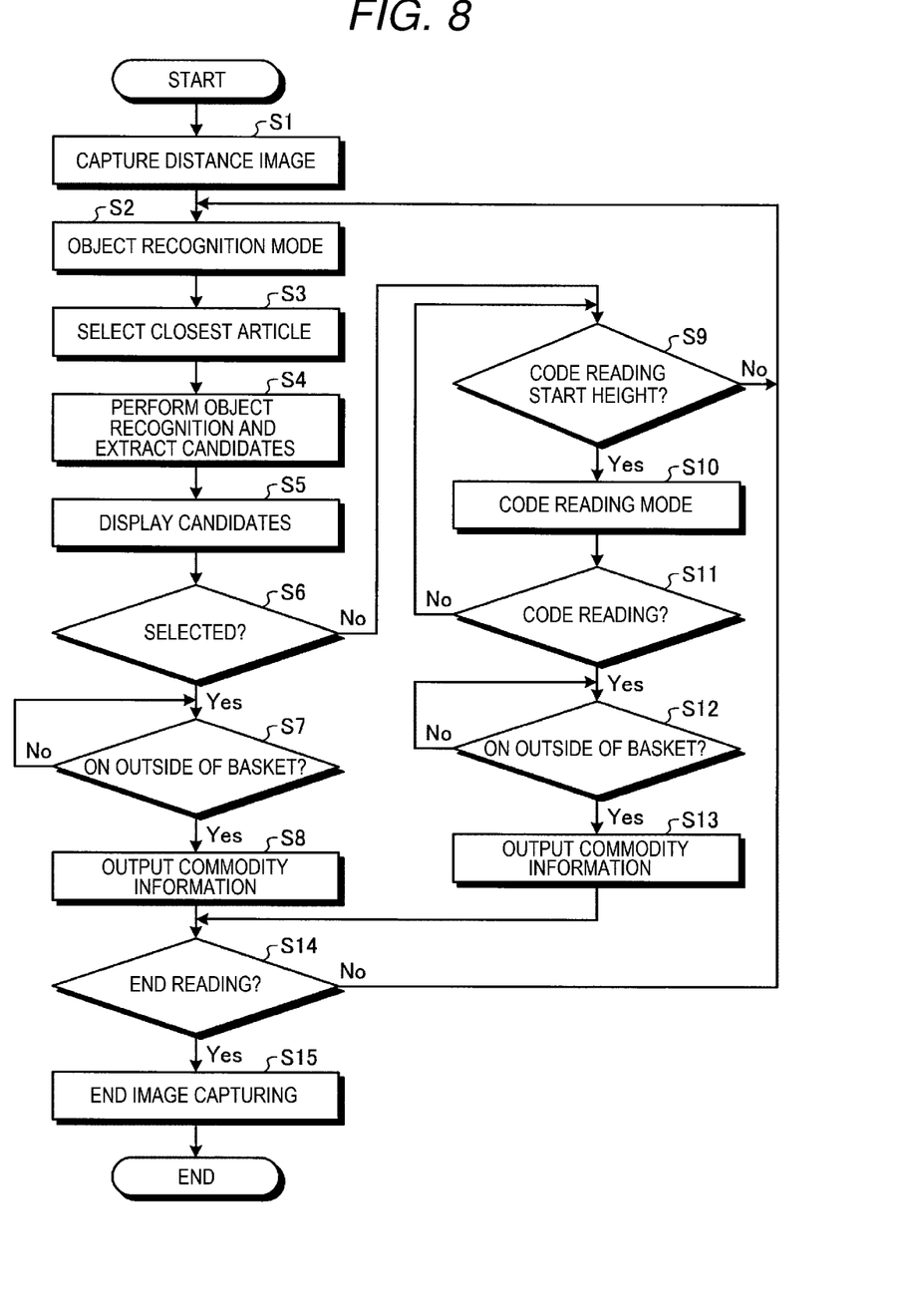
FIG. 8 is a flowchart illustrating a procedure example of reading processing executed by the scanner.

A procedure example of reading processing executed by the scanner 101 is explained. FIG. 8 is a flowchart illustrating the procedure example of the reading processing executed by the scanner 101.

The distance-image reading section 51 starts capturing of a captured image (a distance image) by the imaging section 12 (Act 1). The imaging-mode switching section 57 sets the imaging section 12 in the object recognition mode and starts imaging at a predetermined frame rate (Act 2). In the region of the guidance indicator 72, the object selecting section 52 selects, as an article closest from the imaging section 12, an article located in the top layer based on distance information (Act 3).

The candidate extracting section 53 performs the object recognition processing on an image of the article selected in Act 3 and extracts commodity candidates (Act 4). The display control section 54 displays illustrations (icons) indicating the commodity candidates extracted in Act 4 on the reading screen 70 (Act 5). The operation receiving section 55 determines whether selection operation for any one commodity candidate is received (Act 6). If receiving the selection operation (Yes in Act 6), the display control section 54 reads commodity information of the selected commodity candidate from the commodity master file F1 and displays the commodity information in the read information display region 76.

The object selecting section 52 determine whether an object of the object recognition processing is taken out from the shopping basket 3a and is on the outside of the region of the guidance indicator 72 (see FIG. 5) (Act 7). If it is determined No in Act 7, the object selecting section 52 waits in Act 7. If it is determined Yes in Act 7, the information output section 58 outputs the commodity information read from the commodity master file F1 to the POS terminal 10 (Act 8). Thereafter, the processing shifts to Act 14.

If it is determined No in Act 6, the object selecting section 52 determines whether the distance from the imaging section 12 to an image of the object of the object recognition, that is, an image of an article closest from the imaging section 12 is equal to or smaller than the predetermined distance L1 and the object is lifted to height equal to or larger than the code reading start height H1 (Act 9). If it is determined No in Act 9, the processing returns to Act 2. If it is determined Yes in Act 9, the imaging-mode switching section 57 switches the imaging mode of the imaging section 12 from the object recognition mode to the code reading mode and lights the illuminating section 11 (Act 10). The code reading section 56 starts the code reading processing and extracts an image region of a barcode from a captured image. If the image region of the barcode is extracted, the code reading section 56 decodes the barcode, reads a commodity code, and reads commodity information corresponding to the commodity code from the commodity master file F1. The display control section 54 displays the read commodity information in the read information display region 76.

If the code reading is not performed (No in Act 11), the processing returns to Act 9. After the code reading (Yes in Act 11), the processing shifts to Act 12. The object selecting section 52 determines whether the object of the code reading processing is taken out from the shopping basket 3a and is on the outside of the region of the guidance indicator 72 (Act 12). If it is determined No in Act 12, the object selecting section 52 waits in Act 12. If it is determined Yes in Act 12, the information output section 58 outputs the commodity information read from the commodity master file F1 to the POS terminal 10 (Act 13). The processing shifts to Act 14.

If the operation receiving section 55 receives key operation of a reading end button (not illustrated in FIG. 1) or the like in the keyboard 107 and receives an instruction for a reading end (Yes in Act 14), the distance-image reading section 51 ends the capturing of the captured image (Act 15) and outputs an imaging OFF signal for turning off the imaging section 12 to the imaging section 12. The imaging section 12 ends the imaging operation and, if the illuminating section 11 is lit, extinguishes the illuminating section 11. If it is determined No in Act 14, the processing returns to Act 2 and the object recognition processing is performed.

In the above explanation, it is determined that the commodity is take out from the shopping basket 3a if the object is on the outside of the region of the guidance indicator 72. However, a method of determining whether the commodity is taken out from the shopping basket 3a is not limited to this. As another example, the shopping basket 3a may be identified by image recognition. The commodity information may be output to the POS terminal 10 while being triggered by the object being on the outside of the region of the image recognized as the shopping basket 3a.

In determining that the commodity is taken out from the shopping basket 3a, it may be determined whether the object is on the outside of the image region of the guidance indicator 72 in the lateral direction or may also be determined whether the object is on the outside of the image region in the height direction (i.e., the distance from the imaging section 12). In this case, for example, the height of the shopping basket 3a only has to be set in the scanner 101. If the commodity is in a height position higher than the height of the shopping basket 3a and is on the outside of the region of the shopping basket 3a in the lateral direction, it only has to be determined that the commodity is taken out from the shopping basket 3a. If the commodity is picked up to a position higher than the height of the shopping basket 3a and thereafter to a position higher than the code reading start height H1 (see FIGS. 2 and 3), the code reading processing only has to be started as explained above.

Responses to the re-recognition button 83, the PLU button 81, and the code input button 82 (for all of the buttons, see FIG. 6) are interruptible at any time. That is, if the operation receiving section 55 receives operation of the re-recognition button 83, the processing proceeds to Act 2. The candidate extracting section 53 selects an article closest from the imaging section 12 again (Act 3), executes the object recognition processing, and retries the commodity candidate extraction (Act 4). A procedure in Act 5 and subsequent acts is the same as the procedure explained above.

On the other hand, if the PLU button 81 is operated, the information output section 58 starts PLU processing for selecting a commodity from the commodity master file F1. Concerning the PLU processing, a technique generally used in the past only has to be applied. The information output section 58 receives selection of a commodity via a commodity selection screen or the like hierarchically configured according to commodity classifications. The information output section 58 reads commodity information of the selected commodity from the commodity master file F1. The processing shifts to Act 7.

If the code input button 82 is operated, the information output section 58 starts the code reception processing for directly receiving a commodity code from the tenkey and the like. Concerning the code reception processing, a technique generally use in the past only has to be applied. That is, if a commodity code is input via the tenkey and the like of the keyboard 107, the information output section 58 reads commodity information corresponding to the commodity code from the commodity master file F1. The processing shifts to Act 7.

In this way, in this embodiment, if the distance between the object of the object recognition processing and the imaging apparatus is equal to or smaller than the predetermined distance, the processing for the object is automatically switched from the object recognition processing to the code reading processing. Therefore, concerning a commodity attached with a barcode, if an act for holding up the commodity over the reading window is performed as in the past, it is possible to automatically start the code reading processing. That is, it is possible to switch the processing for the object from the object recognition processing to the code reading processing while being triggered by the familiar act in the past. Therefore, according to this embodiment, it is possible to provide the reading apparatus and the program that can efficiently perform the switching of the object recognition processing and the code reading processing.

The several embodiments are explained above. However, the embodiments are presented as examples and are not intended to limit the scope of the invention. These new embodiments can be implemented in other various forms. Various omissions, substitutions, and changes can be made without departing from the spirit of the invention. These embodiments and modifications of the embodiments are included in the scope and the gist of the invention and included in the inventions described in claims and the scope of equivalents of the inventions.

What is claimed is:

1. A reading apparatus, comprising:
   a captured-image reader configured to read, from an imaging apparatus that captures a captured image associated with distance information indicating distances to articles, the captured image associated with the distance information;
   an article detecting section configured to detect images of articles in a preset predetermined imaging region in the captured image;
   an object recognizing section configured to perform, based on the distance information, object recognition processing of an object, the object being an article closest from the imaging apparatus among the articles detected in the predetermined region; and
   a code reader configured to perform, based on the distance information, if a distance between the object and the imaging apparatus is equal to or smaller than a predetermined distance, code reading processing for detecting a code symbol from the predetermined imaging region and reading code information from the code symbol.

2. The apparatus according to claim 1, further comprising:
   an imaging-condition switching section configured to switch an imaging condition of the imaging apparatus if the distance between the object and the imaging apparatus is equal to or smaller than the predetermined distance.

3. The apparatus according to claim 2, wherein the imaging-condition switching section increases illuminance of illumination for imaging in the code reading processing.

4. The apparatus according to claim 1, further comprising:
   an imaging-condition switching section configured to switch an imaging condition of the imaging apparatus if the distance between the object and the imaging apparatus is equal to or larger than the predetermined distance.

5. The apparatus according to claim 1, further comprising:
   an information output section configured to output the code information read by the code reader as information related to a sales target if the object is outside of the preset predetermined imaging region.

6. The apparatus according to claim 5, further comprising:
   a candidate selecting section configured to select, in the object recognition processing, a commodity candidate corresponding to the object from a commodity-information storing section that associates information related to a captured image of a commodity and identification information for identifying the commodity;
   a display output section configured to selectably output information indicating the commodity candidate to a display; and
   an operation receiving section configured to receive operation for selecting the commodity candidate as a sales target commodity, wherein
   the information output section outputs, as information related to the sales target, information indicating the commodity candidate, the selection operation of which is received by the operation receiving section, if the distance between the object and the imaging apparatus is smaller than the predetermined distance and the object is on the outside of the preset predetermined imaging region.

7. The apparatus according to claim 1, further comprising:
an imaging-condition switching section configured to switch an imaging condition of the imaging apparatus if the article is outside the preset predetermined imaging region.

8. The apparatus according to claim 1, further comprising:
an imaging-condition switching section configured to switch an imaging condition of the imaging apparatus if the article is inside the preset predetermined imaging region.

9. A reading method comprising:
reading, from an imaging apparatus that captures a captured image associated with distance information indicating distances to articles, the captured image associated with the distance information;
detecting images of articles in a preset predetermined imaging region in the captured image;
performing, based on the distance information, object recognition processing of an object, the object being an article closest from the imaging apparatus among the articles detected in the predetermined imaging region; and
performing, based on the distance information, if a distance between the object and the imaging apparatus is equal to or smaller than a predetermined distance, code reading processing for detecting a code symbol from the preset predetermined imaging region and reading code information from the code symbol.

10. The method according to claim 9, further comprising:
switching an imaging condition of the imaging apparatus if the distance between the object and the imaging apparatus is equal to or smaller than the predetermined distance.

11. The method according to claim 9, further comprising:
switching an imaging condition of the imaging apparatus if the distance between the object and the imaging apparatus is equal to or larger than the predetermined distance.

12. The method according to claim 9, further comprising:
outputting the code information read as information related to a sales target if the object is outside of the preset predetermined imaging region.

13. The method according to claim 9, further comprising:
switching an imaging condition of the imaging apparatus if the article is outside the preset predetermined imaging region.

14. A POS terminal, comprising:
a settlement unit;
a captured-image reader configured to read, from an imaging apparatus that captures a captured image associated with distance information indicating distances to articles, the captured image associated with the distance information;
an article detecting section configured to detect images of articles in a preset predetermined imaging region in the captured image;
an object recognizing section configured to perform, based on the distance information, object recognition processing of an object, the object being an article closest from the imaging apparatus among the articles detected in the predetermined region; and
a code reader configured to perform, based on the distance information, if a distance between the object and the imaging apparatus is equal to or smaller than a predetermined distance, code reading processing for detecting a code symbol from the predetermined imaging region and reading code information from the code symbol.

15. The POS terminal according to claim 14, further comprising:
an imaging-condition switching section configured to switch an imaging condition of the imaging apparatus if the distance between the object and the imaging apparatus is equal to or smaller than the predetermined distance.

16. The POS terminal according to claim 15, wherein the imaging-condition switching section increases illuminance of illumination for imaging in the code reading processing.

17. The POS terminal according to claim 14, further comprising:
an imaging-condition switching section configured to switch an imaging condition of the imaging apparatus if the distance between the object and the imaging apparatus is equal to or larger than the predetermined distance.

18. The POS terminal according to claim 14, further comprising:
an information output section configured to output the code information read by the code reader as information related to a sales target if the object is outside of the preset predetermined imaging region.

19. The POS terminal according to claim 17, further comprising:
a candidate selecting section configured to select, in the object recognition processing, a commodity candidate corresponding to the object from a commodity-information storing section that associates information related to a captured image of a commodity and identification information for identifying the commodity;
a display output section configured to selectably output information indicating the commodity candidate to a display; and
an operation receiving section configured to receive operation for selecting the commodity candidate as a sales target commodity, wherein
the information output section outputs, as information related to the sales target, information indicating the commodity candidate, the selection operation of which is received by the operation receiving section, if the distance between the object and the imaging apparatus is smaller than the predetermined distance and the object is on the outside of the preset predetermined imaging region.

20. The POS terminal according to claim 14, further comprising:
an imaging-condition switching section configured to switch an imaging condition of the imaging apparatus if the article is outside the preset predetermined imaging region.

21. The POS terminal according to claim 14, further comprising:
an imaging-condition switching section configured to switch an imaging condition of the imaging apparatus if the article is inside the preset predetermined imaging region.

* * * * *